United States Patent [19]

Matsubara et al.

[11] 4,376,847
[45] Mar. 15, 1983

[54] PROCESS FOR THE PRODUCTION OF STYRENE POLYMERS

[75] Inventors: Tetsuyuki Matsubara; Norifumi Ito; Yuzuru Ishida; Mune Iwamoto, all of Yokohama, Japan

[73] Assignee: Mitsui Toatsu Chemicals, Inc., Tokyo, Japan

[21] Appl. No.: 252,325

[22] Filed: Apr. 9, 1981

[30] Foreign Application Priority Data

Apr. 21, 1980 [JP] Japan ................... 55/51647

[51] Int. Cl.³ .................. C08F 112/04; C08F 112/08; C08F 279/02
[52] U.S. Cl. ..................... 525/262; 525/263; 525/265; 525/301; 525/303; 525/315; 526/232.5; 526/346
[58] Field of Search ............ 526/232.5; 525/263, 525/265, 301, 303, 262, 315

[56] References Cited

U.S. PATENT DOCUMENTS 2,757,166  7/1956  Segro et al. ............... 526/232.5
3,639,370  2/1972  Edl et al. ................. 526/205 X

FOREIGN PATENT DOCUMENTS 52-797    1/1977  Japan .
52-42834  10/1977 Japan .
54-107994 8/1979  Japan .

*Primary Examiner*—Carman J. Seccuro
*Attorney, Agent, or Firm*—Fisher, Christen & Sabol

[57] ABSTRACT

A process for polymerizing a styrene monomer or a styrene monomer having a rubber-like polymer dissolved therein by using, as the catalyst, an organic peroxide of the formula

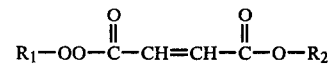

where $R_1$ and $R_2$ are the same or different radicals selected from the group consisting of hydrogen, alkyl radicals of from 1 to 5 carbon atoms, and phenyl. Preferably, the polymerization is continuously carried out by bulk or solution polymerization while the reaction mixture present in the polymerization zone is kept in such a mixed state as to make it substantially homogeneous.

10 Claims, No Drawings

PROCESS FOR THE PRODUCTION OF STYRENE POLYMERS

BACKGROUND OF THE INVENTION

1. Field of the Invention

This invention relates to improvements in a process for polymerizing a styrene monomer or a styrene monomer having a rubber-like polymer dissolved therein by using an organic peroxide as the catalyst.

2. Description of the Prior Art

In the prior art, there are a number of well-known processes for the production of styrene polymers on an industrial scale. For example, styrene polymers can be produced simply by heating a styrene monomer or a styrene monomer having a rubber-like polymer dissolved therein. Alternatively, they can also be produced by adding an organic peroxide (for example, benzoyl peroxide) to the aforesaid monomer and subjecting the resulting reaction mixture to polymerization.

According to the recent trend of the market, high-molecular-weight styrene polymers are preferred with a view to improving the mechanical and thermal strength of styrene resins. One means of achieving such improved resin performance is to increase the average molecular weight of styrene polymers. This can be realized either by reducing the polymerization temperature or by decreasing the amount of polymerization initiator added. However, since there is a conflicting relationship between the polymerization rate and the average molecular weight of the resulting polymer, it is generally difficult to produce styrene polymers having a high average molecular weight at a high polymerization rate, that is, with high productivity.

In order to solve these problems, a number of processes have been proposed. More specifically, Japanese Patent Publication No. 797/1977 discloses a process which comprises effecting bulk or solution polymerization by using 2,5-dimethyl-2,5-di(tert-butylperoxy)hexyne-3 as the catalyst; Japanese Patent Publication No. 42834/1977 discloses a process which comprises effecting continuous polymerization by using 2,5-dimethyl-2,5-di(benzoylperoxy)hexane, 2,5-dimethyl-2,5-di(tert-butylperoxy)hexane or the like as the catalyst and keeping the contents of the polymerization zone in such a mixed state as to make them substantially homogeneous; and Japanes Patent Laid-Open No. 107994/1979 discloses a process which comprises effecting suspension or bulk-suspension polymerization by using 1,1-bis(tert-butylperoxy)cyclohexane or 1,1-bis(tert-butylperoxy)-3,3,5-trimethylcyclohexane as the catalyst.

These prior art processes are based on the technological conception that, in order to improve the mechanical and thermal strength of styrene resins, efforts should be concentrated solely on the preparation of high-molecular-weight styrene polymers in the polymerization step. In practice, however, the high molecular weight of the styrene resins which have been formed into molded articles are important in achieving the desired mechanical and thermal strength. In conventional processes for the production of styrene polymers, the styrene polymer prepared in the polymerization step is subjected to thermal history during the course of after-treatments such as the removal of volatiles and the incorporation of additives, and further heated in the molding step. Thus, the fact is that its average molecular weight is considerably reduced in consequence. Accordingly, in order to produce molded articles having a high average molecular weight, it is most desirable from an industrial point of view to not only achieve a high average molecular weight in the polymerization step but also minimize the reduction in average molecular weight during the course extending from the completion of the polymerization to the fabrication of molded articles.

SUMMARY OF THE INVENTION

It is an object of the present invention to provide a process for continuously polymerizing a styrene monomer or a styrene monomer having a rubber-like polymer dissolved therein to produce high-molecular-weight styrene polymers which can give molded articles having high mechanical and thermal strength.

It is another object of the present invention to provide a process for the production of high-molecular-weight styrene polymers which show no appreciable reduction in average molecular weight during the course of after-treatments following the polymerization step, such as the removal of volatiles and the incorporation of additives, and during the course of forming them into molded articles.

It is still another object of the present invention to provide a process for the production of high-molecular-weight styrene polymers which can enhance their productivity.

The above objects of the present invention are accomplished by a process for continuously polymerizing a styrene monomer or a styrene monomer having a rubber-like polymer dissolved therein by using, as the catalyst, an organic peroxide of the general formula

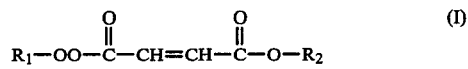

$$R_1-OO-\overset{O}{\underset{\|}{C}}-CH=CH-\overset{O}{\underset{\|}{C}}-O-R_2 \qquad (I)$$

where $R_1$ and $R_2$ are the same or different radicals selected from the group consisting of hydrogen, alkyl radicals of from 1 to 5 carbon atoms, and phenyl.

DESCRIPTION OF THE PREFERRED EMBODIMENTS

The styrene monomers which can be used in the practice of the present invention include styrene, α-methylstyrene and the like as well as their derivatives having one or more additional substituents on the benzene nucleus (for example, p-bromostyrene, p-methylstyrene, p-chlorostyrene, o-bromostyrene and the like). These styrene monomers may be used alone or in admixture. Moreover, copolymerizable monomers such as acrylonitrile, methacrylate esters and the like can be added to these styrene monomers.

The rubber-like polymer which is used in the production of high-impact polystyrene according to the process of the present invention can be any of the rubber-like polymers in common use for that purpose, and typical examples thereof include polybutadiene, copolymers of butadiene and styrene, acrylonitrile, methyl methacrylate or the like, natural rubber, polychloroprene, isoprene-isobutylene copolymer, ethylene-propylene copolymer, ethylene-propylene-diene copolymer and the like.

The amount of rubber-like polymer used is generally in the range of from 1 to 15 parts by weight and preferably from 5 to 10 parts by weight per 100 parts by weight of the styrene monomer.

The organic peroxides which can be used in the practice of the present invention include, for example, tert-butylperoxymaleic acid, methylperoxymaleic acid, isopentylperoxymaleic acid, phenylperoxymaleic acid, methyl pentylperoxymaleate, tert-butyl phenylperoxymaleate, methyl tert-butylperoxymaleate, phenyl tert-butylperoxymaleate and the like.

The amount of organic peroxide used is generally in the range of from 0.003 to 0.3% by weight and preferably from 0.003 to 0.1% by weight based on the weight of the styrene monomer used alone or the weight of the styrene monomer used in conjunction with the rubber-like polymer dissolved therein.

The above-mentioned organic peroxides may be used alone or in admixture. Moreover, they can also be used in admixture with at least one conventional organic peroxide such as benzoyl peroxide, tert-butyl perbenzoate, tert-butyl peroxide or the like.

In the practice of the present invention, the above-defined organic peroxide is added to a styrene monomer or a styrene monomer having a rubber-like polymer dissolved therein and the resulting reaction mixture is subjected to continuous polymerization. More specifically, this continuous polymerization is usually carried out by supplying the reaction mixture to the polymerization zone at a fixed rate and withdrawing a part of the reaction mixture from the polymerization zone at a fixed rate, whereby the amount of reaction mixture present in the polymerization zone is always kept on a constant level.

Moreover, in carrying out the continuous polymerization according to the process of the present invention, the reaction mixture present in the polymerization zone should be in such a mixed state that a flow of the complete mixing type is established, and not in a heterogeneous state (for example, in the form of an emulsion or suspension). Such a flow of the complete mixing type can be realized by adopting a polymerizer of the stirred tank reactor type.

Thus, it is preferable to maintain such a mixed state as to make the reaction mixture substantially homogeneous. More specifically, the expression "such a mixed state as to make the reaction mixture substantially homogeneous" means that, when the reaction mixture is sampled from different portions of the polymerization zone, its variation in the conversion of the styrene monomer into a polymer is within 5% and preferably within 3%.

No particular limitation is placed on the manner in which such a mixed state as to make the reaction mixture substantially homogeneous is maintained. Usually, this can be done by agitating the reaction mixture with the aid of a screw type agitator, anchor type agitator, ribbon type agitator, turbine type agitator or the like, by circulating the reaction mixture with the aid of a pump or the like which is provided outside the polymerization zone, or by combinations thereof.

The most preferred embodiments of the present invention can be achieved by satisfying all of the following requirements:

(1) an organic peroxide of the general formula (I) should be used as the catalsyt, (2) the reaction mixture present in the polymerization zone should be kept in such a mixed state as to make it substantially homogeneous, and (3) the polymerization should be carried out continuously, Thus, even though continuous polymerization is carried out in a complete mixing manner the objects of the present invention cannot be accomplished if conventional organic peroxides other than those of the general formula (I) are used as the catalyst. Similarly, even though an organic peroxide of the general formula (I) is used as the catalyst, the objects of the present invention cannot be accomplished by such polymerization techniques as emulsion polymerization, suspension polymerization and batch-wise bulk polymerization. In this case, the beneficial effects of the present invention are produced only by solution polymerization or continuous bulk polymerization. In particular, the best results are obtained when continuous bulk polymerization or solution polymerization is carried out in such a manner as to make the reaction mixture substantially homogeneous.

In the practice of the present invention, the polymerization temperature is generally not lower than 100° C. and preferably in the range of 100° to 170° C.

The feed material which is continuously supplied to the polymerization zone in the practice of the present invention may comprise only a styrene monomer or a styrene monomer having a rubber-like polymer dissolved therein, or may comprise a partial polymerization product of such a monomer. Moreover, the polymerization of a styrene monomer can be carried out in the presence or absence of a solvent.

Where desired, any of the solvents which are in common use for purposes of solution polymerization and other polymerization techniques (for example, benzene, toluene, ethylbenzene and the like) can be used. The amount of solvent used is generally not greater than 100 parts by weight and preferably not greater than 60 parts by weight per 100 parts by weight of the styrene monomer.

Furthermore, water may be present in the polymerization zone, so long as the reaction mixture is not brought into a heterogeneous state (for example, into the form of an emulsion or the like).

In the practice of the present invention, no particular limitation is placed on the conversion of the styrene monomer into a polymer. However, the conversion is suitably adjusted so as to fall within the range of from 20 to 90%, preferably from 25 to 70% and more preferably from 25 to 60% based on the amount of the styrene monomer used alone or the amount of the styrene monomer used in conjunction with the rubber-like polymer dissolved therein, though it also depends on the number of polymerizers of the agitated vessel type.

According to the process of the present invention, a styrene polymer having a high average molecular weight can be produced in the polymerization step without decreasing its yield per unit time, and the average molecular weight of the styrene polymer formed into molded articles can be kept high by minimizing the reduction in molecular weight during the course extending from the completion of the polymerization to the fabrication of the molded articles.

Generally, when an organic peroxide is used in the polymerization of a styrene monomer, the color properties of molded articles formed from the resulting polymer are poor in many cases. According to the process of the present invention, however, the high average molecular weight and productivity of the polymer are maintained and, at the same time, the color properties of molded articles formed therefrom are very good.

Thus, the process of the present invention is of very great industrial utility in that it can impart excellent performance characteristics to styrene polymers useful as molding materials and can bring about a marked reduction in production cost by increasing the yield of the styrene polymers per unit time.

The present invention will be more fully understood by reference to the following examples. However, these examples are intended merely to illustrate the practice of the intention and are not be construed to limit the scope of the invention.

EXAMPLE 1

A feed material was prepared by dissolving 0.040 part by weight of tert-butylperoxymaleic acid (a product of Nippon Fats and Oils Co.) in 100 parts by weight of styrene. A cylindrical reactor having a capacity of 9.6 liters was provided and the above feed material was continuously supplied thereto through its lower inlet at a rate of 4.8 liters per hour, whereby an average residence time of 2 hours was established. In order to keep the reactor filled with the reaction mixture, a part of the reaction mixture present therein was continuously withdrawn through its upper outlet.

Using a screw type agitator, the reaction mixture present in the reactor was agitated and mixed so that the reaction system would be homogeneous. Moreover, the internal temperature of the reactor was maintained at 130° C.

Ten hours (equal to five times the average residence time) after the start of the continuous polymerization, 2-g samples of the reaction mixture were withdrawn through the sampling valves provided in the lower, middle and upper parts of the reactor. Each of these samples was dissolved in 30 ml of methyl ethyl ketone and the resulting solution was added dropwise to 300 ml of methyl alcohol to form a white precipitate of polystyrene. The polystyrene obtained by drying this white precipitate was dissolved in toluene and its intrinsic viscosity was measured at 30° C. As a result, the intrinsic viscosity of the molded piece was found to be 1.10.

The conversion of the polystyrene obtained by drying the above white precipitate was 45.7, 45.3 and 45.5% for the samples taken from the lower, middle and upper parts of the reactor, respectively.

The reaction mixture continuously withdrawn through the upper outlet of the reactor was subjected to a treatment for the removal of volatiles, in which any unreacted monomer was removed by vacuum distillation. Thereafter, the polystyrene resin thus obtained was pelletized.

Using an ordinary injection molding machine, the above polystyrene resin pellets were molded at 220° C. to form an ASTM test piece. This molded piece was colorless and transparent and showed very excellent color properties. One g of the molded piece was dissolved in 30 ml of methyl ethyl ketone and the resulting solution was added dropwise to 300 ml of methyl alcohol to form a white precipitate. The intrinsic viscosity of this polystyrene was 1.15. The polystyrene obtained by drying this white precipitate was dissolved in toluene and its intrinsic viscosity was measured at 30° C. As a result, the intrinsic viscosity of the molded piece was found to be 1.10.

COMPARATIVE EXAMPLE 1

Using the same reactor as in Example 1, styrene was continuously polymerized in the same manner as described in Example 1 except that the use of tert-butylperoxymaleic acid was omitted. The resulting polystyrene was pelletized and then formed into a molded piece. The analytical results of samples taken from the lower, middle and upper parts of the reactor were in close agreement, and the conversion into polystyrene was 27.3% on the average. When measured in the same manner as described in Example 1, the intrinsic viscosity of the molded piece was 0.94.

COMPARATIVE EXAMPLE 2

A feed material was prepared by dissolving 0.027 part by weight of tert-butyl perbenzoate in 100 parts by weight of styrene. Then, styrene was polymerized in the same manner as described in Example 1 except that the above feed material was used in place of the feed material of Example 1. The resulting polystyrene was formed into a molded piece. The analytical results of samples taken from the lower, middle and upper parts of the reactor were in close agreement, and the conversion into polystyrene was 33.2% on the average. When measured in the same manner as described in Example 1, the intrinsic viscosity of the molded piece was 0.90.

EXAMPLE 2

A feed material was prepared by dissolving 5 parts by weight of polybutadiene in 95 parts by weight of styrene and then dissolving 0.05 part by weight of tert-butylperoxymaleic acid in 100 parts by weight of the resulting solution. Using the same reactor as in Example 1, the above feed material was subjected to continuous polymerization in the same manner as described in Example 1.

Similarly to Example 1, 2-g samples of the reaction mixture were withdrawn through the sampling valves provided in the lower, middle and upper parts of the reactor. Each of these samples was dissolved in 30 ml of toluene and the resulting solution was added dropwise to 300 ml of methyl alcohol to form a white precipitate of the polymer so formed. With regard to the conversion into polystyrene of the styrene included in the feed material, the analytical results of the samples taken from the lower, middle and upper parts of the reactor were in close agreement, and their average value was 46.5%.

Similarly to Example 1, the reaction mixture withdrawn from the reactor was subjected to a treatment for the removal of volatiles. The high-impact polystyrene resin thus obtained was pelletized and then formed into a molded piece. One g of this molded piece was homogeneously dispersed in 50 ml of methyl ethyl ketone and then centrifuged at 12,000 rpm for 30 minutes, whereby the polybutadiene and the polystyrene grafted thereon were separated in the form of an insoluble gel. The supernatant liquid was added dropwise to 500 ml of methyl alcohol to form a white precipitate of the polystyrene separated from the insoluble gel. The intrinsic viscosity of the polystyrene as polymerized was 1.10 and that of the molded piece was 1.06.

EXAMPLE 3

Using the same reactor as in Example 1, styrene was continuously polymerized in the same manner as described in Example 1 except that phenylperoxymaleic acid was used in place of the tert-butylperoxymaleic acid. The resulting polystyrene was pelletized and then formed into a molded piece. The analytical results of samples taken from the lower, middle and upper parts of the reactor were in close agreement, and the conversion into polystyrene was 43.4% on the average. The intrinsic viscosity of the polystyrene as polymerized was 1.04 and that of the molded piece was 1.00.

EXAMPLE 4

A feed material was prepared by dissolving 0.040 part by weight of methyl pentylperoxymaleate in 100 parts by weight of styrene. Using the same reactor as in Example 1, the above feed material was subjected to continuous polymerization in the same manner as described in Example 1. The resulting polystyrene was formed into a molded piece. The analytical results of samples taken from the lower, middle and upper parts of the reactor were in close agreement, and the conversion into polystyrene was 43.0% on the average. The Intrinsic viscosity of the polystyrene as polymerized was 1.02 and that of the molded piece was 0.98.

We claim:

1. In a process for the production of styrene polymers wherein a styrene monomer or a styrene monomer having a rubber-like polymer dissolved therein is polymerized by bulk or solution polymerization using an organic peroxide as the catalyst, the improvement in which
   (a) the organic peroxide is at least one compound of the formula

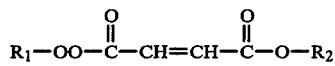

where $R_1$ and $R_2$ are the same or different radicals selected from the group consisting of hydrogen, alkyl radicals of from 1 to 5 carbon atoms, and phenyl;
   (b) the polymerization is continuously carried out at a temperature not lower than 100° C. while the reaction mixture present in the polymerization zone is kept in such a mixed state as to make it substantially homogeneous; and
   (c) the conversion of the styrene monomer into a polymer is controlled so as to fall within the range of from 20 to 90%.

2. The process of claim 1 wherein the styrene monomer is styrene, α-methylstyrene, p-bromostyrene, p-methylstyrene, p-chlorostyrene, o-bromostyrene, or mixtures thereof.

3. The process of claim 1 wherein said rubber-like polymer is polybutadiene, copolymers or butadiene and styrene, acrylonitrile, methyl methacrylate, natural rubber, polychloroprene, isoprene-isobutylene copolymer, ethylene-propylene copolymer, or ethylene-propylene-diene copolymer.

4. The process of claim 1 wherein the mixed state is such that, when the reaction mixture is sampled from different portions of the polymerization zone, its variation in the conversion of the styrene monomer into a polymer is within 3%.

5. The process of claim 1 wherein the organic peroxide is used in an amount of from 0.003 to 0.3% by weight based on the weight of the styrene monomer.

6. The process of claim 1 wherein the polymerization temperature is in the range of from 100° to 170° C.

7. The process of claim 1 wherein the polymerization is carried out by solution polymerization using a solvent in an amount of not more than 100 parts by weight per 100 parts by weight of the styrene monomer.

8. The process of claim 1 wherein the rubber-like polymer is used in an amount of from 1 to 15 parts by weight per 100 parts by weight of the styrene monomer.

9. The process of claim 1 wherein the organic peroxide is tert-butylperoxymaleic acid.

10. The process of claim 1 wherein the organic peroxide is phenylperoxymaleic acid.

* * * * *